(12) United States Patent
Lee et al.

(10) Patent No.: US 6,806,923 B2
(45) Date of Patent: Oct. 19, 2004

(54) TRANSMISSIVE LIQUID CRYSTAL DISPLAY DEVICE INCLUDING HOLOGRAM DIFFUSER

(75) Inventors: Joun-Ho Lee, Daegu (KR); Jong-Weon Moon, Anyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 64 days.

(21) Appl. No.: 10/136,284

(22) Filed: May 2, 2002

(65) Prior Publication Data

US 2002/0163607 A1 Nov. 7, 2002

(30) Foreign Application Priority Data

May 3, 2001 (KR) .................................... 2001-0024170

(51) Int. Cl.⁷ .......................................... G02F 1/1335
(52) U.S. Cl. ........................................ 349/64; 349/112
(58) Field of Search ...................... 349/61–62, 64–65, 349/112

(56) References Cited

U.S. PATENT DOCUMENTS 5,936,751 A * 8/1999 Wenyon ...................... 359/15

2002/0075427 A1 * 6/2002 Colgan et al. ................ 349/95

FOREIGN PATENT DOCUMENTS

| KR | 2000-0076624 | 12/2000 |
| KR | 2001-0028533 | 4/2001 |

* cited by examiner

Primary Examiner—Dung Nguyen
(74) Attorney, Agent, or Firm—Morgan Lewis & Bockius LLP (57) ABSTRACT

A transmissive liquid crystal display device includes first and second transparent substrates spaced apart from each other; a cholesteric liquid crystal color filter on the first substrate; a common electrode on the cholesteric liquid crystal color filter; an array of elements arranged on a first surface of the second transparent substrate facing the first transparent substrate; a hologram diffuser formed on a second surface of the second transparent substrate opposing to the first surface; a liquid crystal layer interposed between the first and second transparent substrates; and a backlight device adjacent to the first transparent substrate.

14 Claims, 4 Drawing Sheets

TRANSMISSIVE LIQUID CRYSTAL DISPLAY DEVICE INCLUDING HOLOGRAM DIFFUSER

This application claims the benefit of Korean Patent Application No. 2001-24170, filed on May 3, 2001 in Korea, which is hereby incorporated by reference.

BACKGROUND OF THE INVENTION

1. Field of the Invention

The present invention relates to a liquid crystal display (LCD) device, and more particularly, to a transmissive liquid crystal display device having a hologram diffuser.

2. Discussion of the Related Art

Liquid crystal display devices, which have properties of small thickness, low weight and low power consumption, are becoming increasingly popular as the information age rapidly evolves. Liquid crystal display devices generally have an array substrate and a color filter substrate, which are spaced apart and face each other. The array substrate includes a plurality of thin film transistors (TFTs), and the color filter substrate includes a color filter layer. Each of the substrates includes an electrode, and the electrodes of substrates face each other. A liquid crystal layer is interposed between the array substrate and the color filter substrate. When a voltage is applied to the liquid crystal layer through the electrodes of the substrates, an alignment of the liquid crystal molecules is changed in accordance with the applied voltage to display image. Because the liquid crystal display devices themselves cannot emit light, they need an additional light source to display images.

The liquid crystal display devices may be classified into three types depending on whether the device has a light source device or not. One type is a transmissive liquid crystal display device that has a backlight device. Another type is a reflective liquid crystal display device that uses ambient light without the backlight device. Still another type is a transflective liquid crystal display device that not only has the backlight device but also uses the ambient light. Among these liquid crystal display device types, the transmissive liquid crystal display device is most common because it can provide invariable brightness when it is placed in dark surroundings.

The liquid crystal display devices need a color filter layer having red (R), green (G) and blue (B) so that the color images can be displayed. The color filter layer contains a dye or pigment to produce the color of red (R), green (G) and blue (B). The thickness of the color filter layer has a proportional relationship with color purity, but an inversely proportional relationship with brightness. Thus, it is difficult to satisfy needs for both color purity and brightness when forming the color filter layer containing the dye or pigment to provide red (R), green (G) and blue (B). To overcome this problem, cholesteric liquid crystal (CLC) has been widely researched and developed in the LCD field to be used as a color filter layer.

The CLC color filter uses a selective transmission or reflection property of the cholesteric liquid crystal. Namely, the CLC color filter does not transmit or reflect all incident light, but selectively transmits or reflects the incident light of a particular wavelength in accordance with a helical pitch of the cholesteric liquid crystal. The transmitted or reflected light may display red (R), green (G) or blue (B) by controlling the helical pitch in accordance with each region of the CLC color filter.

In general, the color that an observer sees when looking at an object can be represented by the wavelength of the light reflected from or transmitted through the object. The wavelength range of visible light is from about 400 nm to about 700 nm. The wavelength of the red light region is about 650 nm, that of green is about 550 nm, and that of blue is about 450 nm. The pitch of the cholesteric liquid crystal is controllable, and therefore, the CLC color filter can selectively transmit or reflect light having the intrinsic wavelength of the color corresponding to a pixel. This enables a pixel to display red (R), green (G) or blue (B) with a high purity. The cholesteric liquid crystal color filter also determines a polarization state of the transmitted or reflected light. The rotational direction of the cholesteric liquid crystal helix is an important factor to a polarization phenomenon. For example, the left-handed cholesteric liquid crystal reflects a left circular polarization that has a wavelength corresponding to the pitch of the left-handed cholesteric liquid crystal. That is, a direction of a circular polarization of the reflected light depends on whether the helix structure of the cholesteric liquid crystal is right-handed or left-handed. Therefore, the CLC color filter has an excellent color purity and contrast ratio, as compared with color filter layers containing the dye or pigment, i.e., absorptive color filters.

As mentioned above, the CLC color filter can selectively transmit the light except reflected portions of the light, which correspond to the helical pitch of the CLC color filter. Therefore, when the CLC color filter is applied to the transmissive liquid crystal display devices, it can display color by way of transmitting the light having the corresponding wavelength. At this point, the transmission wavelength of the CLC color filter can be expressed as follow:

$$\Delta n = n_e - n_o$$

$$\Delta \lambda = \Delta n \cdot P$$

$$\lambda_{peak} = n_{avg} \cdot P,$$

where, $n_e$ is a refractive index for extraordinary light, $n_o$ is a refractive index for ordinary light, $\Delta n$ is a refractive index anisotropy value of the cholesteric liquid crystal material, P is a helical pitch of the cholesteric liquid crystal, $\Delta \lambda$ is a width of refraction wavelength of the cholesteric liquid crystal (CLC) color filter, $\lambda_{peak}$ is a peak wavelength of the reflected light, and $n_{avg}$ is an average refractive index of the cholesteric liquid crystal.

Although the helical pitch of the cholesteric liquid crystal is adjusted for the predetermined color, the displayed color images can be affected by the artificial light from the backlight device. If the incident angle of the light generated from the backlight device is not fixed at a regular value, the refraction wavelength of the CLC color filter can be varied, thereby deteriorating the displayed images. Therefore, a collimated type backlight device, which collects artificial light and directs it in a determined direction, is required. However, such a collimated backlight device can cause a decline in viewing angle due to the fixed emission direction. Thus, a diffuser is applied to the substrate having the CLC color filter to obtain a wide viewing angle. Namely, the narrow viewing angle is compensated by the diffuser.

Figure 1:
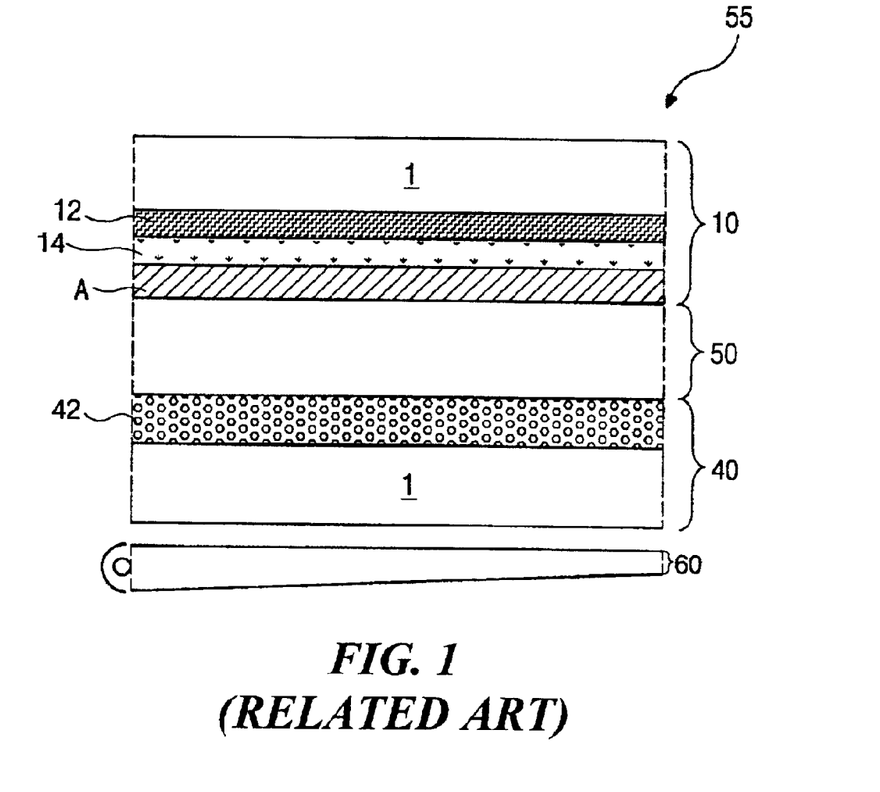
FIG. 1 is a schematic cross-sectional view of a conventional transmissive liquid crystal display device.

FIG. 1 is a schematic cross-sectional view of a conventional transmissive liquid crystal display device. As shown in FIG. 1, the conventional transmissive liquid crystal display device includes a liquid crystal panel 55 and a backlight device 60 beneath the liquid crystal panel 55. The liquid crystal panel 55 includes an upper substrate 10, a lower substrate 40, and a liquid crystal layer 50 therebetween. On a front surface of a transparent substrate 1 of the lower substrate 40, a cholesteric liquid crystal (CLC) color filter 42 is disposed. On a rear surface of the transparent substrate 1 of the upper substrate 10, a hologram diffuser 12 that diffuses artificial light generated from the backlight device 60 is disposed. Array elements "A", such as thin film transistors, which act as switching elements, are arranged beneath the hologram diffuser 12. An overcoat layer 14, which is generally formed of organic substance, is interposed between the hologram diffuser 12 and the array elements "A". The overcoat layer 14 helps hologram diffuser 12 achieve better diffusion effects and serves as a planarizing layer for flattening the surface of hologram diffuser 12 for optimum performance.

Figure 2:
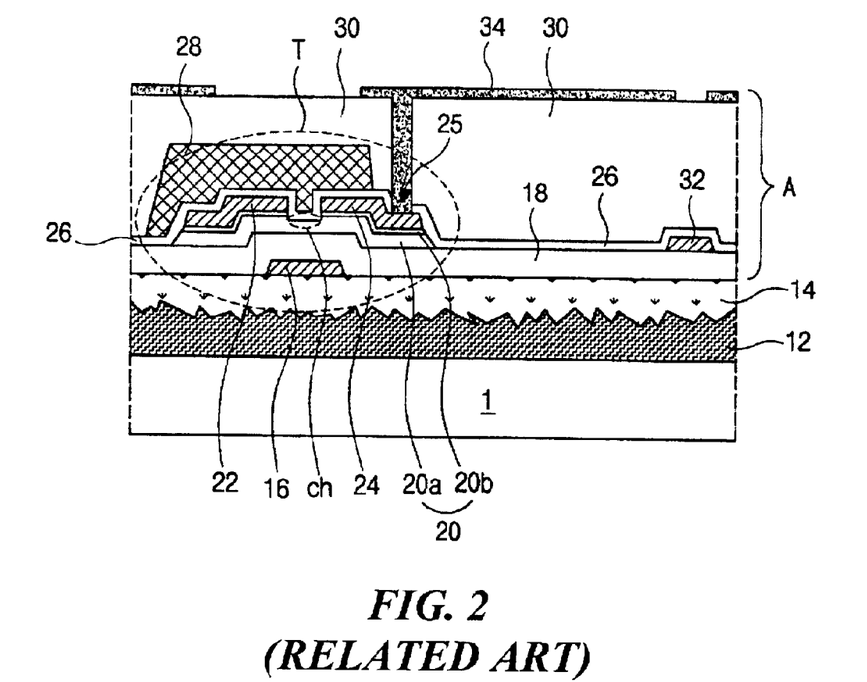
FIG. 2 is an enlarged cross-sectional view illustrating one pixel of the upper substrate of FIG. 1.

The hologram diffuser 12 has a jagged surface (FIG. 2). The jagged pattern is formed using laser beams that include first and second beams, for example. When the first and second laser beams are interfered with each other, an interference pattern is formed on the surface of the hologram diffuser 12. After developing the interference pattern 12, a jagged pattern is formed on the surface of the hologram diffuser 12. Due to the hologram diffuser 12 on the transparent substrate 1, the light generated from the backlight device 60 is refracted and diffused in wide angels. As a result a wide viewing angle can be obtained.

In the conventional transmissive liquid crystal display device shown in FIG. 1, the CLC color filter 42 is disposed in the lower substrate 40, and the array elements "A" are disposed in the upper substrate 10. Further, the hologram diffuser 12 and the overcoat layer 14 are arranged between the array elements "A" and the transparent substrate 1 of the upper substrate 10. The liquid crystal layer 50 is interposed between the upper substrate 10 and the lower substrate 40. The detailed description of the upper substrate 10 will be provided hereafter.

FIG. 2 is an enlarged cross-sectional view illustrating one pixel of the upper substrate 10 of FIG. 1. As shown in FIG. 2, the hologram diffuser 12 is formed on the transparent substrate 1 and the overcoat layer 14 is formed on the hologram diffuser 12. Further, on the overcoat layer 14, the array elements "A" are disposed. In the array elements "A", there are a transparent electrode 34, which transmits the light from the backlight device, and a thin film transistor "T", which acts as a switching device by applying voltage to the transparent electrode 34. The thin film transistor "T" is constructed of a gate electrode 16, a gate insulation layer 18, a semiconductor layer 20, and source and drain electrodes 22 and 24. The gate electrode 16 is formed on the overcoat layer 14, and the gate insulation layer 18 is formed on the entire surface of the overcoat layer 14 to cover the gate electrode 16. The semiconductor layer 20 includes an active layer 20a and the ohmic contact layer 20b, and is formed on the gate insulation layer 18 and over the gate electrode 16. The source and drain electrodes 22 and 24 are formed on the ohmic contact layer 20b and spaced apart from each other. A portion of the ohmic contact layer 20b between the source and drain electrodes 22 and 24 is removed to form a channel "ch" in the active layer 20a.

To protect the channel "ch", a first passivation layer 26 covers the thin film transistor "T". A black matrix 28 is disposed over the thin film transistor "T" to shield the thin film transistor "T" from light. A second passivation layer 30 is formed on the first passivation layer 26 to cover the thin film transistor "T" and the black matrix 28. Preferably, the second passivation layer 30 is made of an organic material. A drain contact hole 25 penetrates both the first and second passivation layers 26 and 30 to expose a portion of the drain electrode 24. A pixel electrode 34 that is made of a transparent conductive material is formed on the second passivation layer 30 and contacts the drain electrodes 24 through the drain contact hole 25.

The black matrix 28 divides the liquid crystal display device into R, G and B color regions and protects the channel "ch". Further, the black matrix 28 shields light from irradiating non-display areas where the liquid crystal molecules are not orientated. The black matrix 28 may instead be formed in the lower substrate 40 with the CLC color filter. However, it is preferable that the black matrix 28 directly covers the channel "ch" because a light leakage can occur when the light is applied to the channel "ch".

In the conventional transmissive liquid crystal display device shown in FIGS. 1 and 2, a data line 32 is formed on the gate insulation layer 18 at the same time of forming the source and drain electrodes 22 and 24, and a gate line (not shown) is formed together with the gate electrode 16. Therefore, the data line 32 and the gate line are electrically connected to the source electrode 22 and the gate electrode 16, respectively. The data line 32 perpendicularly crosses the gate line to define a pixel region where the pixel electrode 34 is located. As shown in FIG. 2, the pixel electrode 34 formed in the pixel region is connected to the drain electrode 24 through the drain contact hole 25, and overlaps a portion of the drain electrode 24 to obtain an increased aperture ratio. As mentioned before, the second passivation layer 30 may be formed of an organic material having a thickness larger than that of the first passivation layer 26 and the gate insulation layer 18 because the relatively thick organic insulator (the second passivation layer 30) prevents the electrical interference between the pixel electrode 34 and the data line 32.

In forming the array elements "A" of FIG. 2, a sputtering process, which deposits metallic materials on the substrate for the electrodes, and the Plasma Enhanced Chemical Vapor Deposition (PECVD) process, which forms the gate insulation layer 18 and the semiconductor layer 20, are required. Furthermore, a photolithography process, a thermal treatment process and other processes are also required. However, these processes for the array elements "A" cause a problem that the overcoat layer 14 and the hologram diffuser 12 are seriously damaged. Therefore, to prevent this problem, materials having excellent thermal stability are needed as the materials for the hologram diffuser 12 and the overcoat layer 14. However, this limits the selectivity of the materials for the hologram diffuser 12 and the overcoat layer 14.

Furthermore, adhesion between the overcoat layer 14 and the gate electrode 16 and adhesion between the overcoat layer 14 and the gate insulation layer 18 are important in determining the quality of liquid crystal display device and the yield. The gate insulation layer 18 is typically made of silicon nitride ($SiN_x$). However, silicon nitride poorly adheres to the organic material of the overcoat layer 14. Furthermore, since the metallic material that forms the gate electrode 16 and gate lines also poorly adheres to the organic material of the overcoat layer 14, insufficient adhesion also occurs therebetween. Also, a gate pad (not shown), which is made of the same material as the gate line and connected to an external driving circuit, is formed at the end of each gate line. When the external driving circuit is connected to the gate pad, the gate pad may be detached from the overcoat layer 14. Additionally, since sealants are formed in the peripheral portions of the substrate before injecting the liquid crystal between the upper and lower substrates, certain portions of the overcoat layer 14 and hologram diffuser 12 should be removed for the sealants, thereby increasing the process steps.

In addition, the hologram diffuser 12 and the overcoat layer 14 are typically formed by spin-coating a resin or an organic material. In such spin-coating, various problems, such as stains, uneven thickness, protrusions, ripple-shaped marks or the like, can occur in the resulting surface. These problems affect the quality of the thin film transistors and decrease the image quality and the yield.

SUMMARY OF THE INVENTION

Accordingly, the present invention is directed to a liquid crystal display device that substantially obviates one or more of the problems due to limitations and disadvantages of the related art.

An object of the present invention is to provide a transmissive liquid crystal display device that prevents damages on a hologram diffuser and an overcoat layer, thereby increasing the quality of the liquid crystal display device.

Another object of the present invention is to provide a transmissive liquid crystal display device that can effectively prevent separation between array elements and an overcoat layer or a hologram diffuser, thereby increasing the manufacturing yield and decreasing the manufacturing time.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a transmissive liquid crystal display device includes first and second transparent substrates spaced apart from each other; a cholesteric liquid crystal color filter on the first substrate; a common electrode on the cholesteric liquid crystal color filter; an array of elements arranged on a first surface of the second transparent substrate facing the first transparent substrate; a hologram diffuser formed on a second surface of the second transparent substrate opposing to the first surface; a liquid crystal layer interposed between the first and second transparent substrates; and a backlight device adjacent to the first transparent substrate. The transmissive liquid crystal display device may further include an overcoat layer on the hologram diffuser.

In the transmissive liquid crystal display device mentioned above, the refractive index of the overcoat layer is set to be higher than that of the hologram diffuser. The backlight device is a collimated type backlight device that radiates light in substantially one direction. The backlight device emits the light substantially in one direction about 20 degrees offset from a normal line to the first and second transparent substrates. The hologram diffuser has a jagged pattern on an outer surface thereof.

In another aspect, the present invention provides a transmissive liquid crystal display device including first and second transparent substrates spaced apart from each other; a cholesteric liquid crystal color filter on the first substrate; a common electrode on the cholesteric liquid crystal color filter; an array of elements arranged on a first surface of the second transparent substrate facing the first transparent substrate; a first overcoat layer formed on a second surface of the second transparent substrate opposing to the first surface; a hologram diffuser formed on the first overcoat layer; a liquid crystal layer interposed between the first and second transparent substrates; and a backlight device adjacent to the first transparent substrate. The transmissive liquid crystal display device may further include a second overcoat layer on the hologram diffuser. The refractive index of the second overcoat layer is set to be higher than that of the hologram diffuser. Furthermore, the hologram diffuser has a jagged pattern on a surface adjacent to the second overcoat layer. The refractive index of the hologram diffuser is higher than that of the first overcoat layer.

In the transmissive liquid crystal display device mentioned above, the backlight device is a collimated type backlight device that directs light in substantially one direction. The backlight device emits light substantially in one direction about 20 degrees offset from a normal line to the first and second transparent substrates. The hologram diffuser has a jagged pattern on an outer surface thereof.

In a further aspect, the present invention provides a liquid crystal display device including a first substrate including, at a surface thereof, a cholesteric liquid crystal color filter and a common electrode; a second substrate including an array of switching elements at a surface thereof and a hologram diffuser over the opposite surface of the second substrate, the second substrate being coupled to the first substrate so that the surface with the color filter and the common electrode of the first substrate faces the surface with the switching element array of the second substrate; and a liquid crystal layer interposed between the first and second substrates.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Where appropriate, the same reference numbers will be used in the drawings to refer to the same or like parts.

Figure 3:
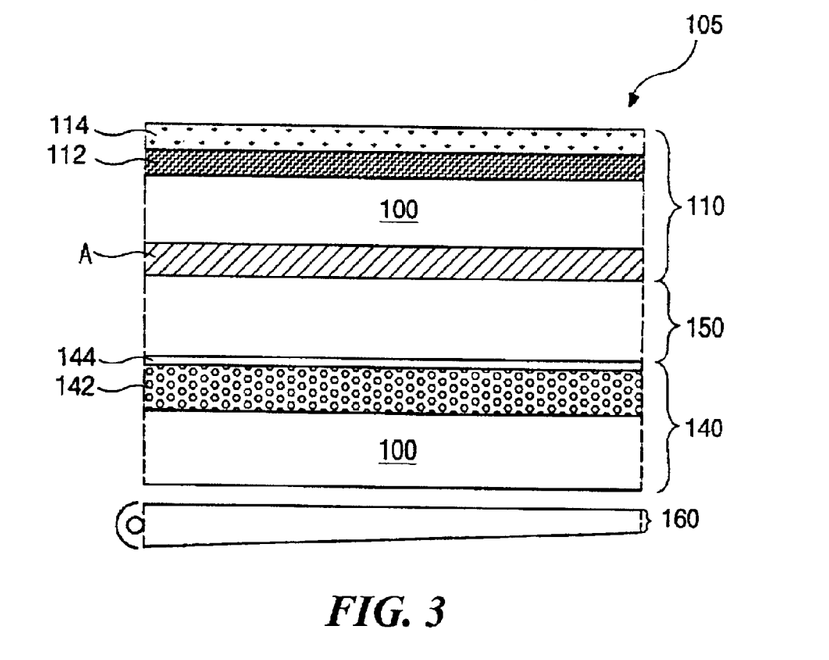
FIG. 3 is a schematic cross-sectional view of a transmissive liquid crystal display device according to a first embodiment of the present invention.

FIG. 3 is a schematic cross-sectional view of a transmissive liquid crystal display device according to a first embodiment of the present invention. As shown in FIG. 3, the transmissive liquid crystal display device of this example includes a liquid crystal panel 105 and a backlight device 160 beneath the liquid crystal panel 105. The backlight device 160 is a collimated type backlight device which collects artificial light in one direction. The liquid crystal panel 105 includes an upper substrate 110, a lower substrate 140, and a liquid crystal layer 150 therebetween. On a front surface of a transparent substrate 100 of the lower substrate 140, a cholesteric liquid crystal (CLC) color filter 142 is disposed. The CLC color filter 142 uses selective reflection of the cholesteric liquid crystal to display desirable colors. A common electrode 144, which induces an electric field to the liquid crystal layer, is formed on the CLC color filter 142.

On a rear surface of the transparent substrate 100 of the upper substrate 110, array elements "A", such as thin film transistors, which act as switching elements, are disposed to orient the liquid crystal layer 150 together with the common electrode 144. On a front surface of the transparent substrate 100 of the upper substrate 110, a hologram diffuser 112 that diffuses artificial light generated from the backlight device 160 is disposed. An overcoat layer 114, which may be formed of organic substance, for example, is formed on the hologram diffuser 112.

In the liquid crystal display device shown in FIG. 3, the liquid crystal layer 150 has a refractive index anisotropy value similar to that of the glass substrate that is typically used for the transparent substrate 100. If the refractive index anisotropy value of the liquid crystal layer 150 largely differs from that of the glass substrate 100, a color interference occurs between the adjacent pixels, thereby deteriorating the image quality. A nematic liquid crystal is typically used for the liquid crystal layer 150, and the refractive index anisotropy value is appropriately adjustable in the liquid crystal layer 150.

In the conventional transmissive liquid crystal display device, the hologram diffuser and the overcoat layer are formed before forming the array elements. Thus, the hologram diffuser and overcoat layer are interposed between the array elements and the transparent substrate. In contrast, according to this example of the present invention, the array elements "A" are formed on one surface of the transparent substrate 100, and the hologram diffuser 112 and the overcoat layer 114 are formed on the opposite surface of the transparent substrate 100. Furthermore, the hologram diffuser 112 and the overcoat layer 114 are formed after forming the array elements "A" on the transparent substrate 100 (i.e., after array process). Additionally, it is possible that the hologram diffuser 112 and the overcoat layer 114 be formed after the lower substrate 140 is attached to the upper substrate 110 (i.e., after cell process). Namely, it is recommended that the hologram diffuser 112 and the overcoat layer 114 be formed before forming a retardation layer and a polarizer on the transparent substrate 100.

In the present example shown in FIG. 3, since the hologram diffuser 112 and the overcoat layer 114 are not formed during the array process, but formed during the cell process, they are not affected by the formation of the array elements "A". Also, should the hologram diffuser 112 and the overcoat layer 114 be re-formed due to the problems of stains, uneven thickness, protrusions, ripple-shaped marks or the like, the array elements "A" will not be affected or damaged by that rework of the hologram diffuser 112 and/or the overcoat layer 114. The poor adhesion between the array elements and the overcoat layer, which occurs in the conventional transmissive liquid crystal display device, can also be prevented.

Figure 4:
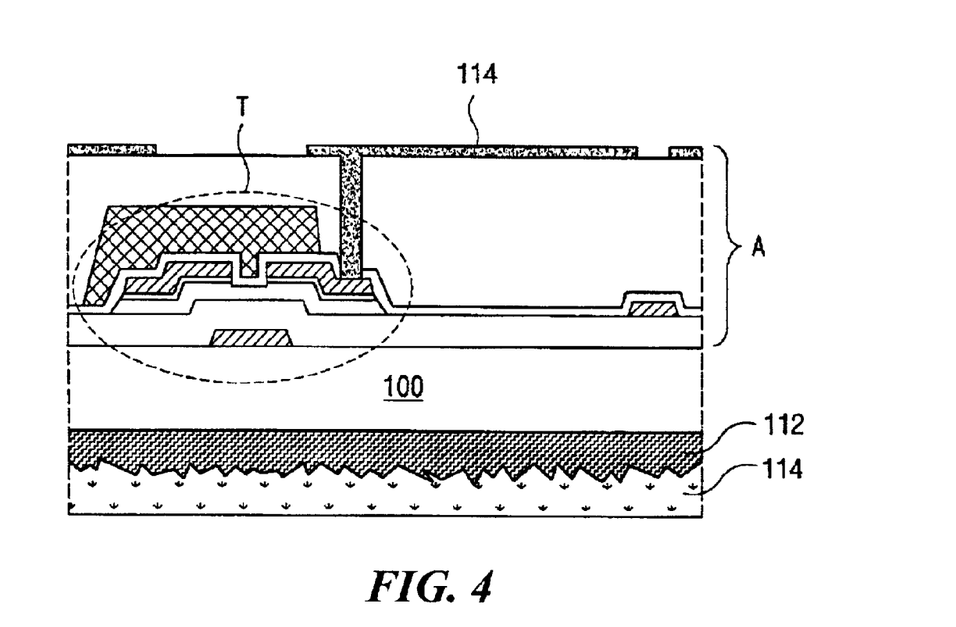
FIG. 4 is an enlarged cross-sectional view illustrating one pixel of the upper substrate of FIG. 3.

FIG. 4 is an enlarged cross-sectional view illustrating one pixel of the upper substrate of FIG. 3. Here, the array elements "A" have the same structure and configuration as the conventional structure shown in FIG. 2, and accordingly, the detailed explanation of array elements "A" will be omitted here.

In FIG. 4, the array elements "A" each include a pixel electrode 114 and a thin film transistor "T". The pixel electrode 114 is connected to the thin film transistor "T". The array elements "A" are formed on a first surface of the transparent substrate 100, while the hologram diffuser 112 is formed on a second surface of the transparent substrate 100. The overcoat layer 114 is formed on the hologram diffuser 112. As described before, the hologram diffuser 112 has a jagged cross-sectional pattern, and this jagged surface of the hologram diffuser 112 borders on the overcoat layer 114. The jagged pattern of the hologram diffuser 112 diffuses artificial light generated from the backlight device 160 in various directions so that a wide viewing angle is obtained. Alternatively, the overcoat layer 114 may be formed on the second surface of the transparent substrate 100, and the hologram diffuser 112 may be formed on the overcoat layer 114. In such a reversed construction, the jagged pattern should be located between the overcoat layer and the hologram diffuser.

In the transmissive liquid crystal display device shown in FIG. 4, the refractive index of the overcoat layer 114 is set to be higher than that of the hologram diffuser 112. When a light ray strikes a planar boundary between two transparent media, a part of the light is reflected back into the first medium, and the remaining part passes through the boundary into the second medium. The law of reflection holds for the reflected portion of the light as if the surface were a mirror. When the portion of the light passes through the boundary, the light beam bends sharply at the boundary. Like the reflected beam having the angle of reflection $\theta_{1a}$, the refracted beam lies in the plane of incidence. To describe refraction quantitatively, the angel of incidence $\theta_1$ is compared with the angle of refraction $\theta_2$. As in the case of reflection, both the angle of incidence and the angle of refraction are conventionally measured with respect to the normal to the surface. In view of Snell's Law, the angle of incidence and the angle of refraction are expressed as follows:

$$n_1 \sin \theta_1 = n_2 \sin \theta_2 \qquad \text{Equation (1)}$$

where, $n_1$ is the index of refraction of a first medium and $n_2$ is the index of refraction of a second medium. When the incident light travels from the first medium to the second medium, the angle of refraction $\theta_2$ can therefore be represented as follows:

$$\theta_2 = \sin^{-1}[(n_1/n_2) \cdot \sin \theta_1] \qquad \text{Equation (2)}$$

From equation (2), with a constant angle of incidence $\theta_1$, the ratio of the indices of refraction increases as the angle of refraction $\theta_2$ increases. Also, as the angle of refraction $\theta_2$ increases, the viewing angle increases. Therefore, in determining the materials for the hologram diffuser 112 and the overcoat layer 114, the refractive index of the material for the overcoat layer 114 should be higher than that of the material for the hologram diffuser 112. That is, the outer layer should have a higher refractive index value than that of the inner layer to improve the viewing angle.

Figure 5:
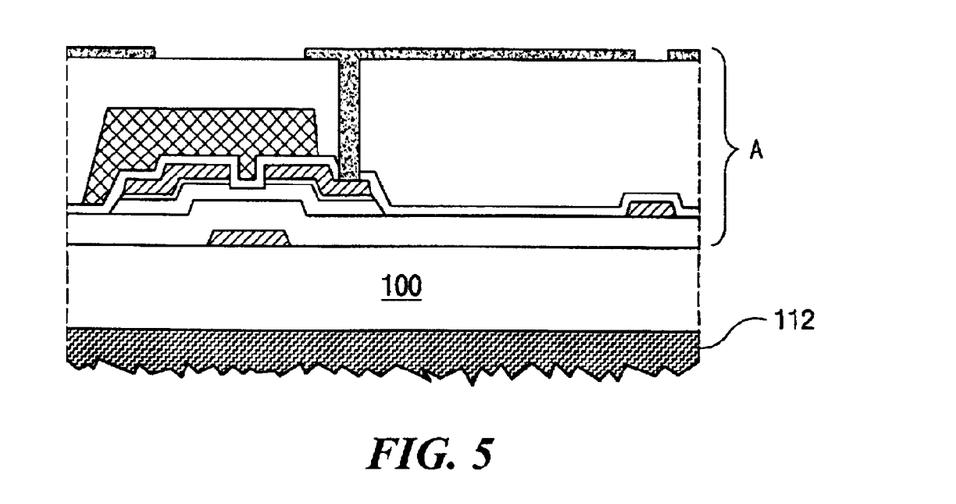
FIG. 5 is an enlarged cross-sectional view illustrating one pixel of the upper substrate according to a second embodiment of the present invention.

FIG. 5 is an enlarged cross-sectional view illustrating one pixel of the upper substrate according to a second embodiment of the present invention. In FIG. 5, array elements "A" are formed on a first surface of the transparent substrate 100. On the opposite surface (second surface) of the transparent substrate 100, a hologram diffuser 112 is formed without an overcoat layer. Here, as shown in FIG. 5, the jagged surface of the hologram diffuser 112 is facing the outside. When forming a polarizer on the hologram diffuser 112 using an adhesive in a later step, the jagged surface helps improve the adhesion between the polarizer and the hologram diffuser 112. In the second embodiment of the present invention, the number of process steps can be decreased, thereby decreasing the production costs.

Figure 6:
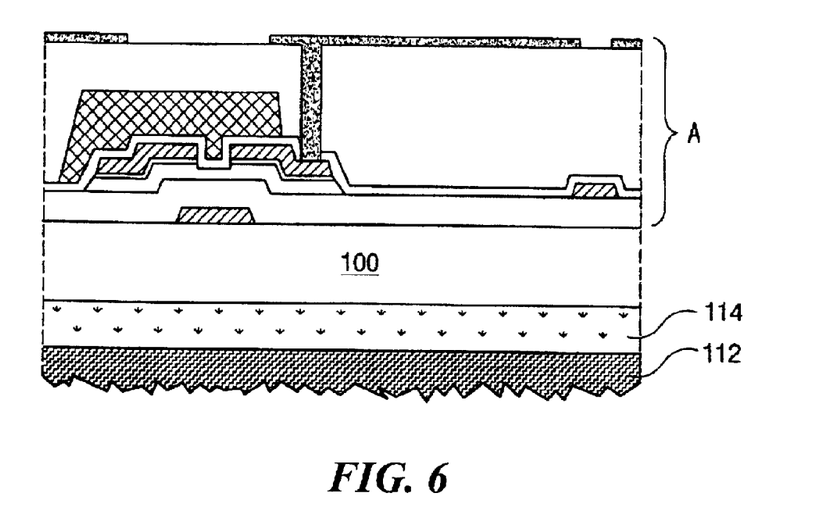
FIG. 6 is an enlarged cross-sectional view illustrating one pixel of the upper substrate according to a third embodiment of the present invention.

FIG. 6 is an enlarged cross-sectional view illustrating one pixel of the upper substrate according to a third embodiment of the present invention. In FIG. 6, array elements "A" are formed on the first surface of the transparent substrate 100. On the opposite surface (second surface) of the transparent substrate 100, an overcoat layer 114 is formed, and then a hologram diffuser 112 is formed on the overcoat layer 114. Here, the jagged surface of the hologram diffuser 112 faces the outside. Since the hologram diffuser 112, not the overcoat layer 114, is arranged in the outer portion of the upper substrate, the material for the hologram diffuser 112 should have a higher refractive index value than that for the overcoat layer 114. This way, owing to the refractive index difference between the overcoat layer 114 and the hologram diffuser 112, a wide viewing angle is obtained.

Figure 7:
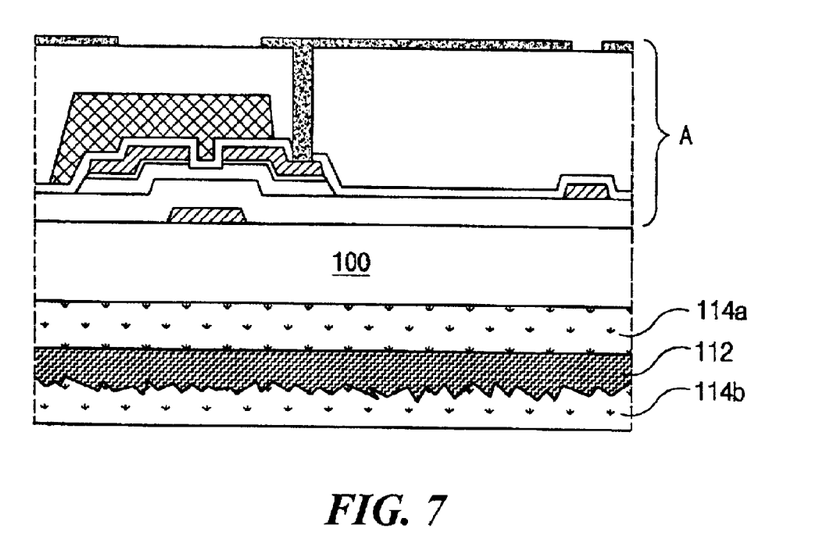
FIG. 7 is an enlarged cross-sectional view illustrating one pixel of the upper substrate according to a fourth embodiment of the present invention.

FIG. 7 is an enlarged cross-sectional view illustrating one pixel of the upper substrate according to a fourth embodiment of the present invention. In FIG. 7, array elements "A" are formed on the first surface of the transparent substrate 100. On the opposite surface (second surface) of the transparent substrate 100, a first overcoat layer 114a is formed, and then a hologram diffuser 112 is formed on the first overcoat layer 114a. Furthermore, a second overcoat layer 114b is formed on the hologram diffuser 112. The jagged surface of the hologram diffuser 112 faces the second overcoat layer 114b. The second overcoat layer 114b acts as a planarizing layer for flattening the surface of the entire structure for optimum performance. Additionally, the first and second overcoat layers 114a and 114b help the hologram diffuser 112 diffuse the light, thereby increasing the viewing angle.

Moreover, a first retardation film and a first polarizer can be sequentially formed on the outer surface of the upper substrate 110. Such a configuration can be applied to the first to fourth embodiments of the present invention described above. On the rear surface of the lower substrate 140, a second retardation film and a second polarizer may be sequentially formed. The first and second retardation films may be adapted to produce a phase difference of ¼ of the wavelength.

According to the present invention, the backlight device applied to the first to fourth embodiments above emits the artificial light substantially in one direction about 20 degrees offset from a normal line to the transparent substrate. The second to fourth embodiments described above can be used for the upper substrate 110 of FIG. 3.

The transmissive liquid crystal display device according to the preferred embodiments of the present invention has, among other things, the following advantages. First, since the hologram diffuser and the overcoat layer can be formed in a process different from that for forming the array elements, these layers are not damaged by potential adverse effects during the array process. Thus, the quality and stability of the liquid crystal display device are increased. Second, when selecting the materials for the hologram diffuser and overcoat layer, consideration of the thermal stability of the materials is no longer required. Third, since the hologram diffuser and the overcoat layer are formed on a surface oppose to the array elements, the re-work (such as re-forming them) can be easily carried out. Additionally, even if re-work of the hologram diffuser and overcoat layer is performed, the array elements are not affected by the re-work process, thereby improving the quality of the array elements.

While various embodiments are described above as combinations of specific layers, various other layers may be interposed between or on the layers appeared above so long as such modifications come within the scope or sprit of the invention as described above.

It will be apparent to those skilled in the art that various modifications and variation can be made in the transmissive liquid crystal display device including hologram diffuser of the present invention without departing from the spirit or scope of the invention. Thus, it is intended that the present invention cover the modifications and variations of this invention provided they come within the scope of the appended claims and their equivalents.

What is claimed is:

1. A transmissive liquid crystal display device, comprising:

first and second transparent substrates spaced apart from each other;

a cholesteric liquid crystal color filter on the first substrate;

a common electrode on the cholesteric liquid crystal color filter;

an array of elements arranged on a first surface of the second transparent substrate facing the first transparent substrate;

a hologram diffuser formed on a second surface of the second transparent substrate opposing to the first surface;

a liquid crystal layer interposed between the first and second transparent substrates;

a backlight device adjacent to the first transparent substrate, and an overcoat layer on the hologram diffuser, wherein a refractive index of the overcoat layer is higher than that of the hologram diffuser.

2. The device according to claim 1, wherein the backlight device is a collimating backlight device that directs light in substantially one direction.

3. The device according to claim 1, wherein the backlight device emits the light substantially in one direction about 20 degrees offset from a normal line to the first and second transparent substrates.

4. The device according to claim 1, wherein the hologram diffuser has a jagged pattern on an outer surface thereof.

5. A transmissive liquid crystal display device, comprising:

first and second transparent substrates spaced apart from each other;

a cholesteric liquid crystal color filter on the first substrate;

a common electrode on the cholesteric liquid crystal color filter;

an array of elements arranged on a first surface of the second transparent substrate facing the first transparent substrate;

a first overcoat layer formed on a second surface of the second transparent substrate opposing to the first surface;

a hologram diffuser formed on the first overcoat layer;

a liquid crystal layer interposed between the first and second transparent substrates; and a backlight device adjacent to the first transparent substrate, wherein a refractive index of the hologram diffuser is higher than that of the first overcoat layer.

6. The device according to claim 5, further comprising a second overcoat layer on the hologram diffuser.

7. The device according to claim 6, wherein the refractive index of the second overcoat layer is higher than that of the hologram diffuser.

8. The device according to claim 6, wherein the hologram diffuser has a jagged pattern on a surface facing the second overcoat layer.

9. The device according to claim 5, wherein the backlight device is a collimating backlight device that directs light in substantially one direction.

10. The device according to claim 5, wherein the backlight device emits the light substantially in one direction about 20 degrees offset from a normal line to the first and second transparent substrates.

11. The device according to claim 5, wherein the hologram diffuser has a jagged pattern on an outer surface thereof.

12. A liquid crystal display device, comprising:

a first substrate including, at a surface thereof, a cholesteric liquid crystal color filter and a common electrode;

a second substrate including an array of switching elements at a surface thereof and a hologram diffuser over a surface of the second substrate opposite to the surface with the switching element array, the second substrate being coupled to the first substrate so that the surface with the color filter and the common electrode of the first substrate faces the surface with the switching element array of the second substrate, the second substrate further including an overcoat layer coupled to the hologram diffuser, wherein a refractive index of the overcoat layer is higher than that of the hologram diffuser; and a liquid crystal layer interposed between the first and second substrates.

13. The liquid crystal display device according to claim 12, further comprising a backlight device adjacent to the first substrate.

14. The liquid crystal display device according to claim 12, wherein at least one of surfaces of the hologram diffuser has an uneven surface profile.

* * * * *